(12) United States Patent
Sharma et al.

(10) Patent No.: US 12,468,599 B1
(45) Date of Patent: Nov. 11, 2025

(54) DATA STORAGE DEVICE AND METHOD FOR EFFICIENT DATA-STORAGE-DEVICE-TO-DATA-STORAGE-DEVICE COPYING

(71) Applicant: Sandisk Technologies, Inc., Milpitas, CA (US)

(72) Inventors: Amit Sharma, Bangalore (IN); Dinesh Kumar Agarwal, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 8 days.

(21) Appl. No.: 18/658,142

(22) Filed: May 8, 2024

(51) Int. Cl.
*G06F 11/10* (2006.01)
*G06F 11/20* (2006.01)

(52) U.S. Cl.
CPC ...... *G06F 11/1068* (2013.01); *G06F 11/1016* (2013.01); *G06F 11/2056* (2013.01)

(58) Field of Classification Search
CPC ............. G06F 11/1068; G06F 11/1016; G06F 11/2056
See application file for complete search history.

(56) References Cited

U.S. PATENT DOCUMENTS

| 8,112,574 | B2 | 2/2012 | Lee et al. | |
|---|---|---|---|---|
| 8,472,295 | B1 | 6/2013 | Jin et al. | |
| 10,860,228 | B1 | 12/2020 | Mulani et al. | |
| 11,068,391 | B2 | 7/2021 | Hsu et al. | |
| 11,170,869 | B1 | 11/2021 | Helmick et al. | |
| 2014/0304456 | A1* | 10/2014 | Narasimha | G06F 13/1694 711/103 |
| 2015/0052329 | A1* | 2/2015 | Fujinami | G06F 12/1027 711/207 |
| 2017/0025400 | A1* | 1/2017 | Khalaf | G06F 3/0629 |
| 2021/0034457 | A1* | 2/2021 | Kim | G06F 11/0772 |

* cited by examiner

*Primary Examiner* — Thien Nguyen
(74) *Attorney, Agent, or Firm* — Crowell & Moring LLP

(57) ABSTRACT

A data storage device and method for efficient data-storage-device-to-data-storage-device copying are disclosed. In one embodiment, a data storage device is provided comprising a memory and one or more processors. The one or more processors, individually or in combination, are configured to: receive, from a host, a command to place the data storage device in a data-storage-device-to-data-storage-device copy mode; receive, from a source data storage device via the host, a plurality of blocks of data and logical-to-physical address translation information for the plurality of blocks of data; and write, in the memory, the plurality of blocks of data and the logical-to-physical address translation information for the plurality of blocks of data without creating parity information or new logical-to-physical address translation information for the plurality of blocks of data. Other embodiments are provided.

16 Claims, 7 Drawing Sheets

DATA STORAGE DEVICE AND METHOD FOR EFFICIENT DATA-STORAGE-DEVICE-TO-DATA-STORAGE-DEVICE COPYING

BACKGROUND

In some environments, all data from a source data storage device is copied to a target data storage device. For example, in virtual storage pools or data centers, it is common to replace a worn-out solid-state drive (SSDs) with a new SSD. In this device-to-device copy process, a host uses standard read/write commands to read data from the source data storage device and write the data to the target data storage device. As part of this write process, the target data storage device generates parity information and physical-to-logical address translation information for the written data.

DETAILED DESCRIPTION

Figure 1A:
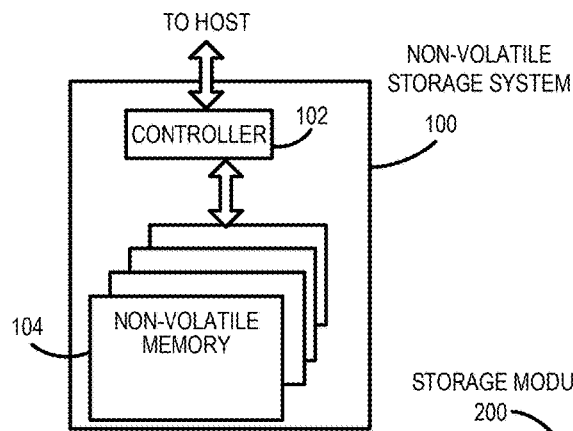
FIG. 1A is a block diagram of a data storage device of an embodiment.

The following embodiments generally relate to a data storage device and method for efficient data-storage-device-to-data-storage-device copying. In one embodiment, a data storage device is provided comprising a memory and one or more processors. The one or more processors, individually or in combination, are configured to: receive, from a host, a command to place the data storage device in a data-storage-device-to-data-storage-device copy mode; receive, from a source data storage device via the host, a plurality of blocks of data and logical-to-physical address translation information for the plurality of blocks of data; and write, in the memory, the plurality of blocks of data and the logical-to-physical address translation information for the plurality of blocks of data without creating parity information or new logical-to-physical address translation information for the plurality of blocks of data.

In some embodiments, permanent parity information for the plurality of blocks of data is received from the host and written in the memory.

In some embodiments, the one or more processors, individually or in combination, are further configured to: inform the host of an error in writing one of the plurality of blocks of data in the memory; receive, from the host, a command to retry writing the one of the plurality of blocks of data in the memory; and retry writing the one of the plurality of blocks of data in the memory but to a different destination block.

In some embodiments, the one or more processors, individually or in combination, are further configured to: copy one of the plurality of blocks of data written in one block of the memory to a different block of the memory; and maintain a data structure indicating a location of the different block of the memory.

In some embodiments, the one or more processors, individually or in combination, are further configured to: receive, from the host, an inquiry as to whether the data storage device supports the data-storage-device-to-data-storage-device copy mode; and inform the host that the data storage device supports the data-storage-device-to-data-storage-device copy mode.

In some embodiments, the plurality of blocks of data are received and written on a block-to-block basis.

In some embodiments, the plurality of blocks of data are all valid blocks.

In some embodiments, the data storage device and the source data storage device are compatible data storage devices.

In some embodiments, the data storage device and the source data storage device are both solid state drives.

In some embodiments, the data storage device of claim 1, wherein the memory comprises a three-dimensional memory.

In another embodiment, a method for copying data from a source data storage device to a target data storage device. The method is performed in a host in communication with the source data storage device and the target data storage device. The method comprises: reading, from the source data storage device, data and logical-to-physical address translation information for the data; sending the data and logical-to-physical address translation information for the data to the target data storage device for storage in a memory of the target data storage device; and instructing the target data storage device not to generate parity information or logical-to-physical address translation information for the data.

In some embodiments, permanent parity information for the data is read from the source data storage device and sent to the target data storage device for storage in the memory of the target data storage device.

In some embodiments, the method further comprises: receiving, from the target data storage device, an error in writing part of the data; and instructing the target data storage device to retry writing the part of the data.

In some embodiments, the method further comprises: sending, to the target data storage device, an inquiry as to whether the target data storage device supports a data-storage-device-to-data-storage-device copy mode; and receiving, from the target data storage device, an indication that the target data storage device supports the data-storage-device-to-data-storage-device copy mode.

In some embodiments, the data is read from the source data storage device and sent to the target data storage device on a block-to-block basis.

In some embodiments, the method further comprises determining that the data is valid data.

In some embodiments, the source and target data storage devices are compatible data storage devices.

In some embodiments, the source and target data storage devices are both solid state drives.

In some embodiments, the memory of the target data storage device comprises a three-dimensional memory.

In yet another embodiment, a data storage device is provided comprising: a memory; and means for: receiving, from a host, data from a source data storage device to be written in the memory of the data storage device; and writing the data in the memory of data storage device without creating parity information or logical-to-physical address translation information for the data per an instruction from the host.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Figure 1B:
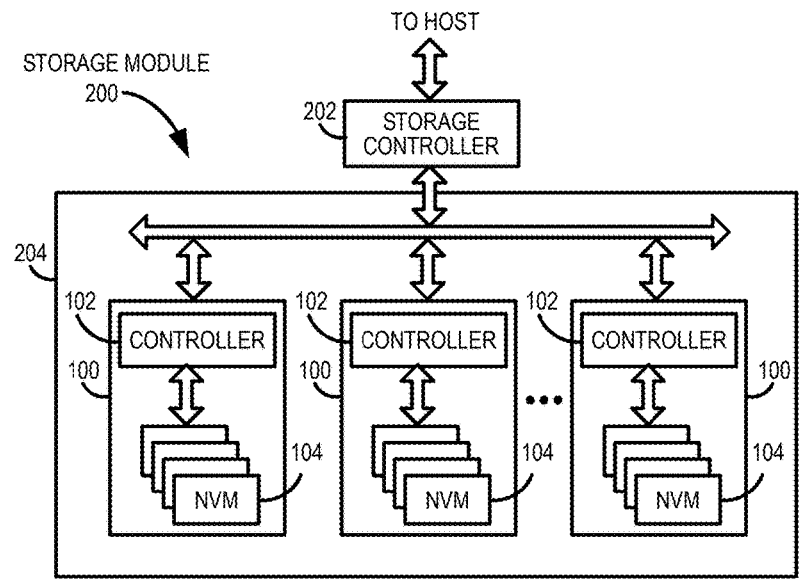
FIG. 1B is a block diagram illustrating a storage module of an embodiment.
Figure 1C:
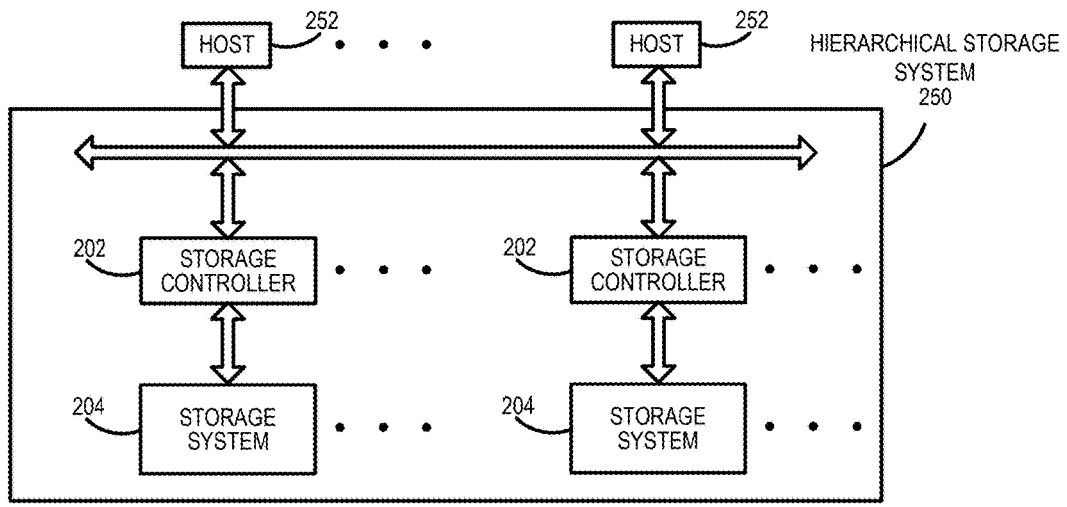
FIG. 1C is a block diagram illustrating a hierarchical storage system of an embodiment.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
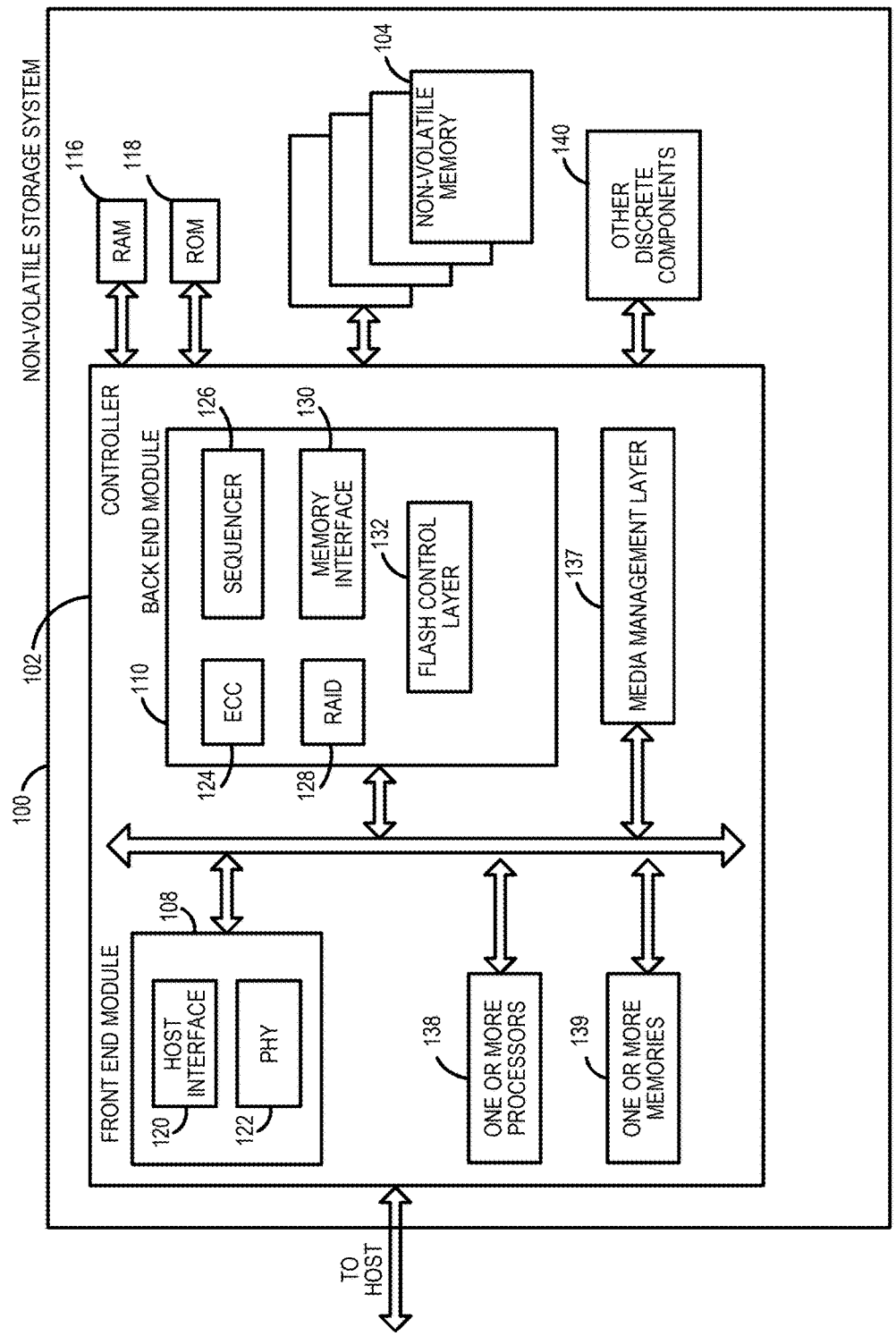
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
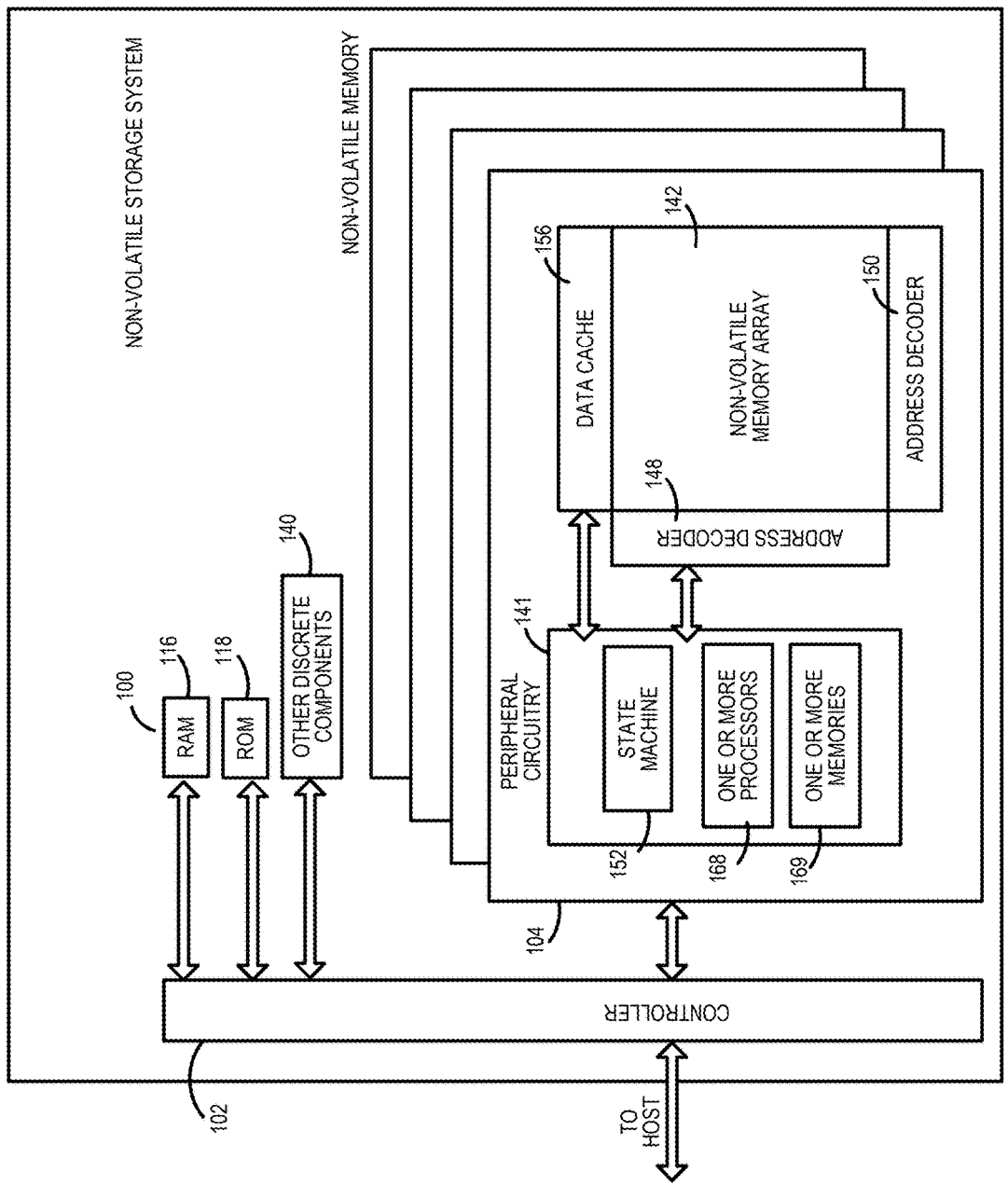
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
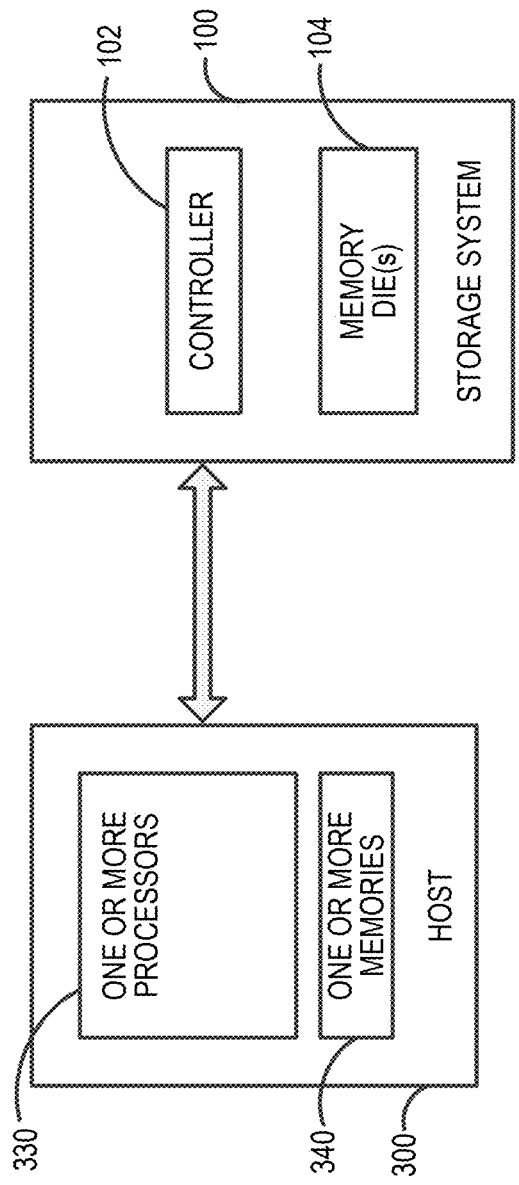
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

The Flash control layer 132 in FIG. 2A (which will sometimes be referred to herein as the Flash translation layer (FTL)) is responsible for managing operations on the data storage device 100. The Flash control layer 132/FTL which can be implemented using the one or more processors 138 in the data storage device 100, undertakes various responsibilities that, in addition to writing host data to the memory 104, also results in additional tasks related to memory writes and processing by the one or more processors 138 (e.g., central processing unit (CPU) processing). Two such examples of additional tasks beyond the host data writes performed by the FTL are parity generation and the generation of logical-to-physical address translation and other necessary FTL data. These two tasks will be described below.

Regarding parity generation, firmware architectures typically has two types of exclusive-or (XOR) parities: temporary and permanent. Temporary parity is used for blocks that are currently being written with incomplete programming, which are susceptible to failures that may impact the complete block. In such situations, when dealing with an open block, additional parity is generated. This supplementary parity is stored in the memory 104 until the block is fully programmed. Consider a data storage device with eight-die metablocks as an example. In this case, the data from each die block is combined through XOR operations to produce parity. This ensures that if any one of the individual blocks fails, it can be recovered using the additional parity. In other words, to program a 1 TB drive, for example, 1 TB/8=128 GB worth of such parity would be generated. This parity data (128 GB in this example) during programming increases write amplification and may also reduce performance but may be considered necessary overhead.

In contrast to temporary parity, permanent parity is a more-compressed form of parity protecting few wordlines in a metablock. Permanent parity is also stored alongside host data. The permanent parity may need the use of volatile memory (e.g., RAM 116) and the one or more processors 138 (e.g., CPU). In cost-constrained environment, such parity generation might have impact on performance.

As mentioned above, another example of additional tasks beyond the host data writes performed by the FTL is the generation of logical-to-physical (L2P) address translation and other necessary FTL data. One of the responsibilities of FTL is to generate, store, and manage L2P and other internal data (such as a global address table (GAT). For any host write operations, in addition to writing host data to the memory 104, the FTL can perform actions within the data storage device 100. For example, the FTL can generate L2P deltas in RAM 116. Typically, every 4 KB worth of host data would have an L2P entry. This entry is not immediately written to the memory 104. Instead, the entry can be kept in the RAM 116 so that, later, multiple entries can be written together. These entries in the RAM 116 are called a GAT delta. As another example, when the RAM 116 associated with L2P deltas gets full, some entries can be evicted from RAM 116 and stored in the non-volatile memory 104. In a typical process, the RAM 116 is searched for best candidate, which involves firmware/CPU overhead. The flash copy that needs updated entries that are being evicted from the RAM 116 is read from the non-volatile memory 104. This can incur firmware, NAND sense, and frequency division multiple access (FDMA) transfer overheads. Then, deltas are applied to the NAND copy. Few entries of the NAND page would have newer updates, and those would be updated in RAM 116 to the NAND copy. Firmware and CPU overheads are incurred here. Finally, the page is written back to the non-volatile memory 104.

To summarize, during a Host write operations, the FTL carries out multiple operations that involve additional NAND writes/reads. While these operations result in increased write amplification and performance overhead for the device, they may be considered essential and necessary to protect against failures. These extra operations also require use of the one or more processors 138 in the data storage device 100, which can reduce performance of the data storage device 100. Particularly in budget-constrained data storage devices, the data storage device's performance may suffer due to the need for the one or more processors 138 (e.g., the CPU) to perform these extra operations.

The problem noted above can be particularly problematic in virtual storage pools or data centers, where it is common to replace worn-out solid-state drives (SSDs) with new ones. In such scenarios, the content of the old SSD is copied to the new SSD during these transfer operations. Data copy is a regular host write operation to full device capacity to the newer SSDs. As highlighted above, data copy to the new SSD can generate a lot of temporary data that can increase write amplification and can occupy a great deal (e.g., $\frac{1}{4}^{th}$ or $\frac{1}{8}^{th}$) of the data storage device's capacity. Further, traditional writes can require RAM and CPU resources, as well as a direct memory access (DMA) to generate L2P entries.

The following embodiments can be used to enhance the copy process from one data storage device to another while reducing write amplification and improving overall performance as compared to the process described above. While these embodiments will be illustrated in terms of an SSD, it should be understood that these embodiments can be used with any suitable type of data storage device. As such, the use of an SSD should not be read into the claims unless expressly recited therein.

As mentioned above, an SSD copy can use typical logical block address (LBA) writes command where each LBA is read from the source SSD and written to the target SSD. As highlighted above, this process can create a significant amount of temporary parity (e.g., in an 8-die, 1 TB device, around 128 GB of temporary parity can be produced), which is eliminated when an open block is closed. This process also generates L2P entries though L2P delta collection methodology, which requires higher RAM and CPU resources.

Instead of generating temporary parity for each metablock and generating run-through full cycle of L2P information, the following embodiments provide a new data copy mode. In this new copy mode, all physical blocks are copied from one SSD to another SSD directly without taking the traditional data write path. So, in the prior method, host copies LBA-by-LBA full capacity from the source SSD to the target SSD, and the target SSD generates parity and L2P information. In contrast, in this embodiment, the host 300 (e.g., the one or more processors 330 in the host 300) educates itself about the valid blocks of the source SSD. All valid blocks (e.g., blocks having valid data) are copied (alongside with the L2P entries and other control data) to the target SSD. The host 300 would educate the target SSD that given block data is coming and should be written to a block in the target SSD. The data copy can include all the internal data structures that are required by the FTL to function. In this embodiment the host 300 would direct the target SSD not to generate any parity. After each block copy, the host 300 would ask for confirmation whether a block has been programmed without errors. In case of an error, the same block would be sent again by the host 300 for programming. On completion of the copy of all of the blocks, the host 300 would send a notification that all of the blocks have been copied to the target SSD. In this embodiment, the FTL in the data storage device 100 simply parses the blocks and gets all the necessary information (e.g., L2P tables, host data, etc.). If firmware of both SSDs are compatible, the target SSD can simply use L2P table generated by the source SSD.

Figure 4:
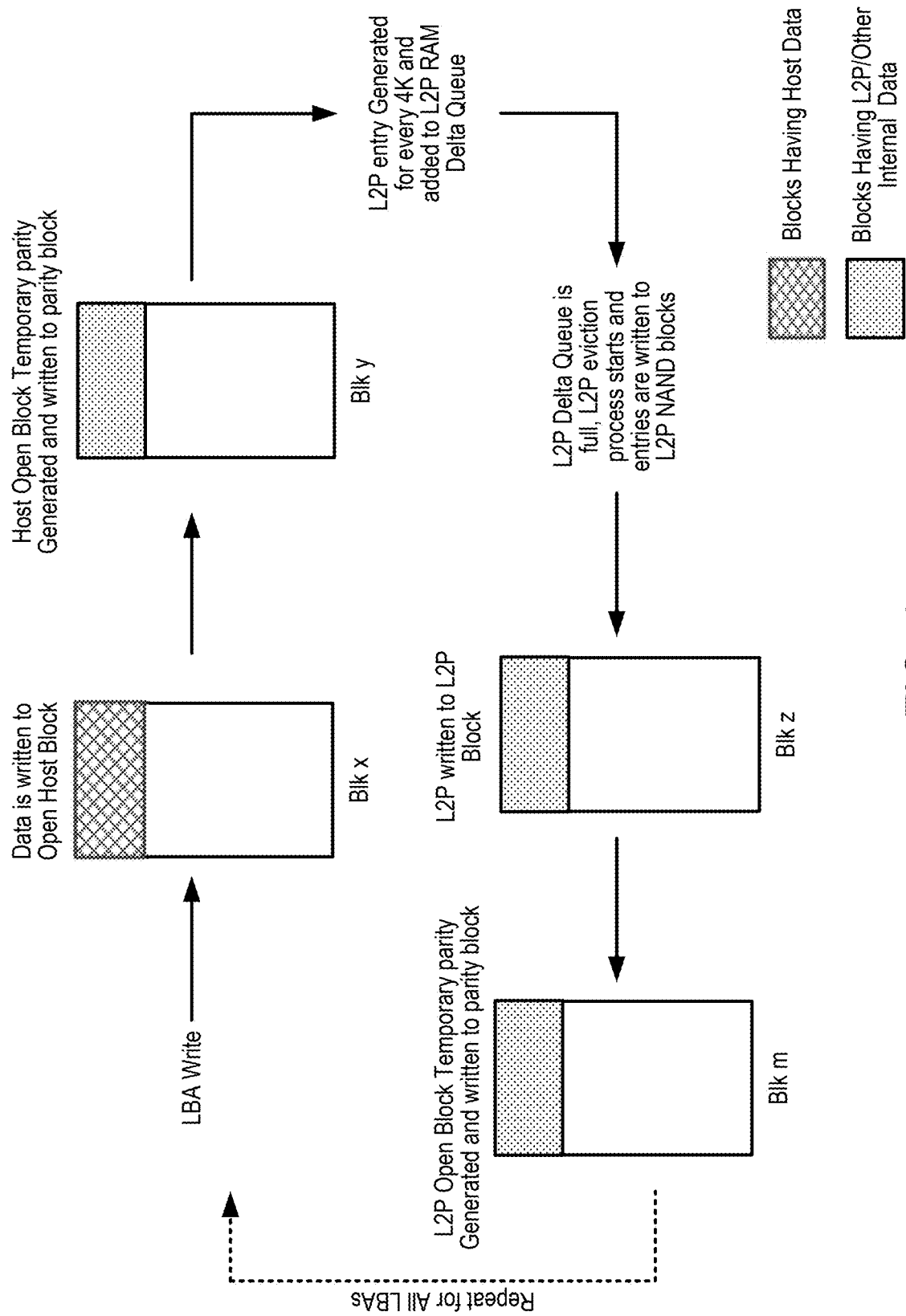
FIG. 4 is a diagram illustrating a copy operation from a source data storage device to a target data storage device in which the target data storage device generates parity and logical-to-physical address translation information.
Figure 5:
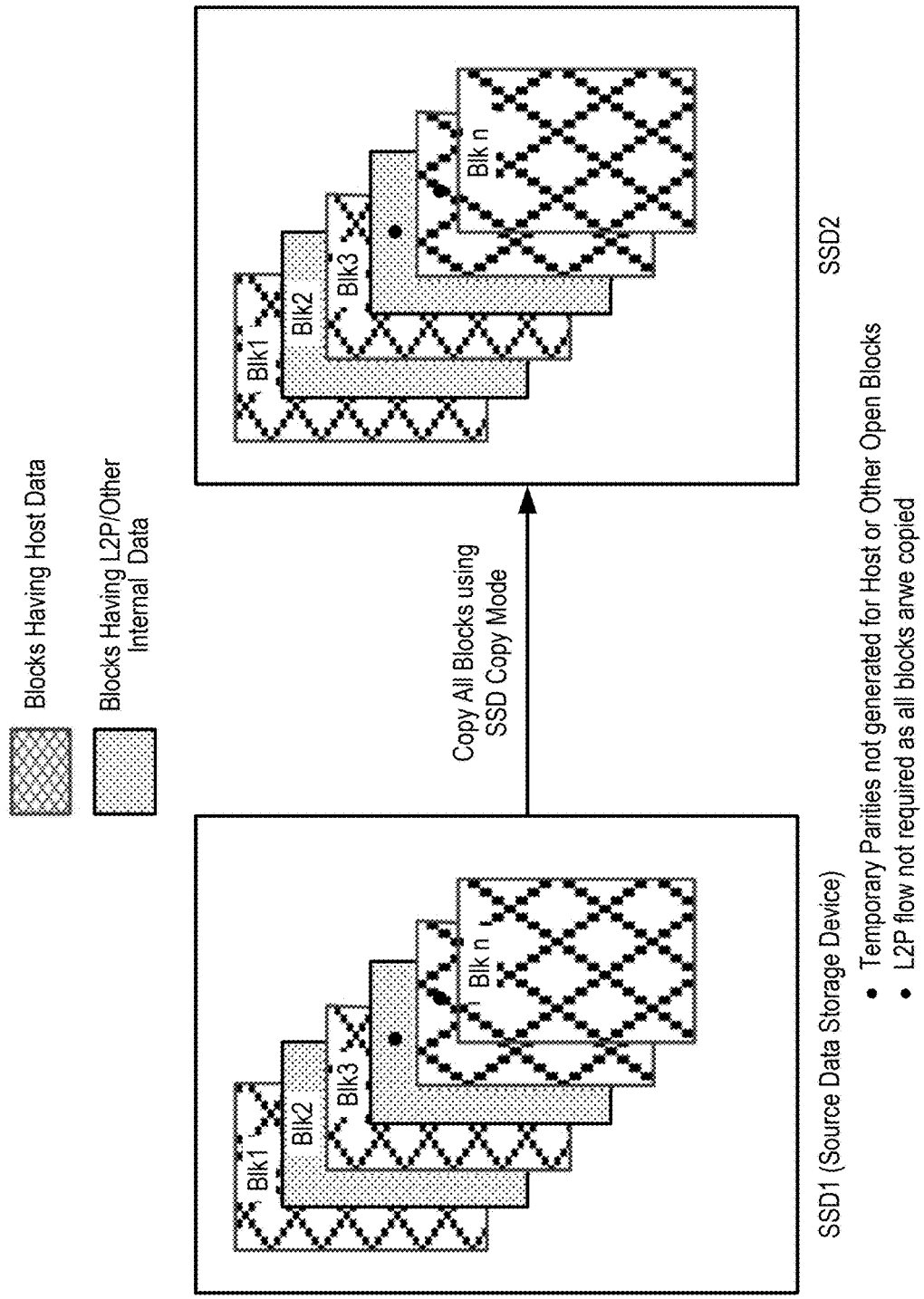
FIG. 5 is a diagram illustrating a copy operation from a source data storage device to a target data storage device in which the target data storage device does not generate parity and logical-to-physical address translation information.

FIGS. 4 and 5 are diagrams that illustrate the above. FIG. 4 illustrates the typical copy operation noted above, and FIG. 5 illustrates a copy operation of this embodiment. As compared to the copy operation in FIG. 4, the copy operation in FIG. 5 does not generate parity and logical-to-physical address translation information. So, in this embodiment, the host 300 would start copying data in a block-by-block (e.g., a metablock-by-metablock) fashion to the target data storage device. In this mode, the host 300 would direct the target data storage device not to generate parity or L2P entries. Instead, the L2P entries generated by the source data storage device would be used in target data storage device.

The following paragraphs will now describe a parity avoidance mechanism. In one embodiment, the controller of the target data storage device would pass the status of each block program to the host. If one of the blocks encounters a failure during programming, the host can again start the copy process of failed block. This time, the controller of the target data storage device can choose a new block as the destination. With this methodology, the controller of the target data storage device would not need failure protection through temporary parity. Additionally, the controller of the target data storage device would not need to generate permanent parity, as that parity would be copied to target data storage device alongside with other data. It should be noted that if a given block is copied to different location, the target data storage device can maintain a data structure (e.g., an index table) indicating the new location of the block.

Figure 6:
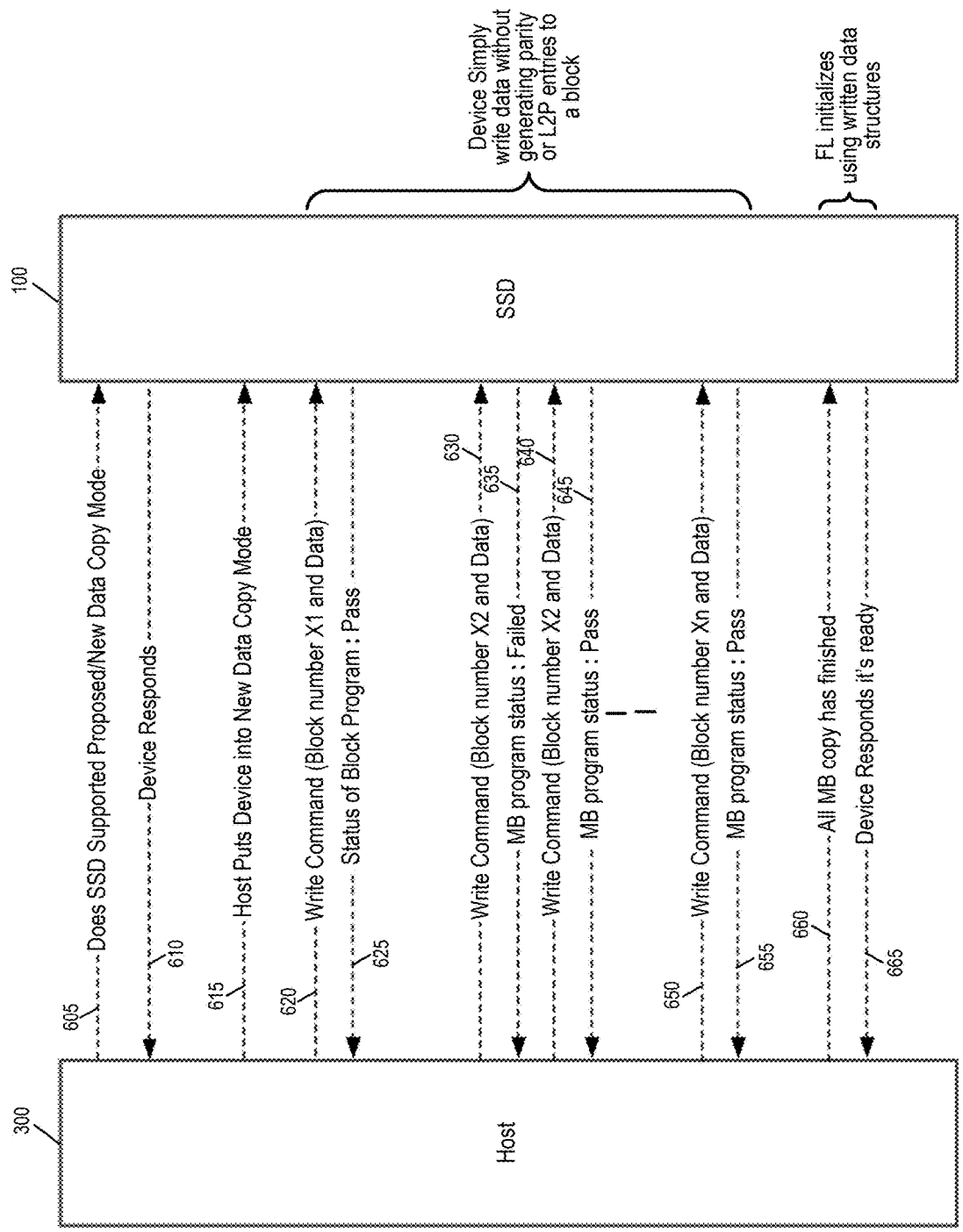
FIG. 6 is a flow diagram of a host-device handshake of an embodiment.

FIG. 6 is flow diagram of a host-device handshake that can be used to achieve the above. In this handshake, the host 300 (e.g., the one or more processors 330 in the host) asks the target data storage device 100 (e.g., the one or more processors 138) in the data storage device 100) if the data storage device 100 supports this new copy operation (605), and the data storage device 100 responds (610). The host 300 then puts the data storage device 100 in the new data copy mode (615), after which the host 300 begins the process of writing data block-by-block to the data storage device 100 (620). The data storage device 100 responds with a pass message for a successful write (625). However, if a write was unsuccessful, the data storage device 100 informs the host 300, and the host retries the programming (630, 635, 640, 645). Because the data storage device 100 is placed in the new copy mode, the data storage device 100 simply writes the data without generating parity or L2P entries to the block. This block-by-block write process continues until the host 300 writes all the blocks from the source data storage device to the data storage device 100 (650, 655, 660, 665).

As shown in this diagram, the host can detect if the target SSD supports the newer data copy mode and is compatible with the old SSD. If so, the data copy method would be performed, as described above. Further optimizations can be built where blocks with no valid data would be skipped while copying them to proposed method.

There are several advantages associated with these embodiments. For example, these embodiments can be used to reduce write amplification, as well as boost the device copy process even in low-cost SSDs, as these embodiments may need less RAM, DMA, and CPU resources compared to prior copy processes. This provides better performance and a faster copy even in low-cost SSDs. Further, these embodiments can be used anywhere where a full drive copy is performed (e.g., where an information technology (IT) team sets-up various machines using a full-image copy). Also, these embodiments can be used if both the source and target data storage devices are compatible (e.g., both having compatible L2P table format/structure), which can be an incentive for use to choose a compatible data storage device as a replacement.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/ or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
 a memory; and
 one or more processors, individually or in combination, configured to:
  operate in a data-storage-device-to-data-storage-device copy mode, wherein in the data-storage-device-to-data-storage-device copy mode, the data storage device is configured to:
   receive, from a source data storage device via the host, a plurality of blocks of data, parity information for the plurality of blocks of data, and logical-to-physical address translation information for the plurality of blocks of data;
   write, in the memory, the plurality of blocks of data, the parity information for the plurality of blocks of data, and the logical-to-physical address translation information for the plurality of blocks of data;

instead of generating additional parity information for the plurality of blocks of data:
    determine whether each block of the plurality of blocks of data was written in the memory without error; and
    in response to determining that an error occurred in writing one of the plurality of blocks of data, re-write that block of data in a different location in the memory; and
    instead of generating new logical-to-physical address translation information for the plurality of blocks of data, use the logical-to-physical address translation information received from the host.

2. The data storage device of claim 1, wherein the one or more processors, individually or in combination, are further configured to:
    copy one of the plurality of blocks of data written in one block of the memory to a different block of the memory; and
    maintain a data structure indicating a location of the different block of the memory.

3. The data storage device of claim 1, wherein the one or more processors, individually or in combination, are further configured to:
    receive, from the host, an inquiry as to whether the data storage device supports the data-storage-device-to-data-storage-device copy mode; and
    inform the host that the data storage device supports the data-storage-device-to-data-storage-device copy mode.

4. The data storage device of claim 1, wherein the plurality of blocks of data are received and written on a block-to-block basis.

5. The data storage device of claim 1, wherein the plurality of blocks of data are all valid blocks.

6. The data storage device of claim 1, wherein the data storage device and the source data storage device are compatible data storage devices.

7. The data storage device of claim 1, wherein the data storage device and the source data storage device are both solid state drives.

8. The data storage device of claim 1, wherein the memory comprises a three-dimensional memory.

9. A method for copying data from a source data storage device to a target data storage device, the method comprising:
    performing in a host in communication with a source data storage device and a target data storage device, wherein the target data storage device operates in a data-storage-device-to-data-storage-device copy mode:
        reading, from the source data storage device, data, parity information for the data, and logical-to-physical address translation information for the data;
        sending the data, parity information for the data, and logical-to-physical address translation information for the data to the target data storage device for storage in a memory of the target data storage device; and
        instructing the target data storage device not to generate additional parity information or new logical-to-physical address translation information for the data, wherein the target data storage device is configured to:
            instead of generating the additional parity information for the data:
                determine whether the data was written in the memory without error; and
                in response to determining that an error occurred in writing the data, re-write the data in a different location in the memory; and
            instead of generating the new logical-to-physical address translation information for the data, use the logical-to-physical address translation information received from the host.

10. The method of claim 9, further comprising:
    sending, to the target data storage device, an inquiry as to whether the target data storage device supports the data-storage-device-to-data-storage-device copy mode; and
    receiving, from the target data storage device, an indication that the target data storage device supports the data-storage-device-to-data-storage-device copy mode.

11. The method of claim 9, wherein the data is read from the source data storage device and sent to the target data storage device on a block-to-block basis.

12. The method of claim 9, further comprising determining that the data is valid data.

13. The method of claim 9, wherein the source and target data storage devices are compatible data storage devices.

14. The method of claim 9, wherein the source and target data storage devices are both solid state drives.

15. The method of claim 9, wherein the memory of the target data storage device comprises a three-dimensional memory.

16. A data storage device comprising:
    a memory; and
    means for operating the data storage device in a data-storage-device-to-data-storage-device copy mode in which the data storage device is configured to:
        receive, from a source data storage device via the host, a plurality of blocks of data, parity information for the plurality of blocks of data, and logical-to-physical address translation information for the plurality of blocks of data;
        write, in the memory, the plurality of blocks of data, the parity information for the plurality of blocks of data, and the logical-to-physical address translation information for the plurality of blocks of data;
        instead of generating additional parity information for the plurality of blocks of data:
            determine whether each block of the plurality of blocks of data was written in the memory without error; and
            in response to determining that an error occurred in writing one of the plurality of blocks of data, re-write that block of data in a different location in the memory; and
        instead of generating new logical-to-physical address translation information for the plurality of blocks of data, use the logical-to-physical address translation information received from the host.

\* \* \* \* \*